United States Patent [19]

Maruyama et al.

[11] 4,269,729

[45] May 26, 1981

[54] MICROENCAPSULATION PROCESS AND RESULTING MICROCAPSULES

[75] Inventors: Hitoshi Maruyama; Koichi Kajitani; Makoto Shiraishi, all of Kurashiki, Japan

[73] Assignee: Kuraray Co., Ltd., Kurashiki, Japan

[21] Appl. No.: 59,733

[22] Filed: Jul. 23, 1979

[30] Foreign Application Priority Data

Jul. 21, 1978 [JP] Japan .................................. 53-89843

[51] Int. Cl.$^3$ ................................................. B01J 13/02
[52] U.S. Cl. .......................................... 252/316; 8/526; 71/64 F; 106/308 M; 252/522 A; 282/27.5; 424/33; 428/307; 428/914
[58] Field of Search ........................... 252/316; 424/33

[56] References Cited

U.S. PATENT DOCUMENTS

| | | |
|---|---|---|
| 3,258,442 | 6/1966 | Sinclair ............................ 252/316 X |
| 3,574,133 | 4/1971 | Bayless et al. ...................... 252/316 |
| 3,627,693 | 12/1971 | Scarpelli ............................ 252/316 |
| 3,687,865 | 8/1972 | Katayama et al. ................... 252/316 |
| 3,812,056 | 5/1974 | de la Torriente et al. .......... 252/316 |
| 3,875,074 | 4/1975 | Vassiliades et al. ................ 252/316 |

*Primary Examiner*—Richard D. Lovering
*Attorney, Agent, or Firm*—Oblon, Fisher, Spivak, McClelland & Maier

[57] ABSTRACT

Microcapsules having walls formed from polyvinyl alcohol are prepared by dispersing a substantially water insoluble nuclear material in an aqueous solution of a polyvinyl alcohol polymer, which solution has a cloud point, phase separating and depositing a concentrated aqueous solution of the polyvinyl alcohol polymer as a separated phase around said nuclear material from the bulk continuous phase by maintaining the temperature of the system above the cloud point of the aqueous polyvinyl alcohol polymer solution, and subjecting the phase separated solution to conditions which substantially solidify or gel said polyvinyl alcohol polymer in said concentrated aqueous solution of said separated phase around said nuclear material but which do not substantially solidify or gel the polyvinyl alcohol in the diluted aqueous solution of the continuous phase.

12 Claims, No Drawings

MICROENCAPSULATION PROCESS AND RESULTING MICROCAPSULES

BACKGROUND OF THE INVENTION

1. Field of the Invention

The present invention relates to a process for producing microcapsules whose walls are fabricated from a polyvinyl alcohol polymer.

2. Description of the Prior Art

Processes are known in which the walls of microcapsules are prepared by liquid-liquid phase separation using polyvinyl alcohol type polymers in an aqueous medium (French Pat. No. 1,304,891; Examined Japanese Patent Publication No. 72-26575; U.S. Pat. No. 3,574,133 and British Pat. No. 1,198,412).

In these processes, however, the polyvinyl alcohol polymers used are soluble in water at temperatures within the range from 0° C. to 100° C. and therefore the liquid-liquid phase separation of a simple aqueous polyvinyl alcohol solution cannot be induced without the aid of a third substance. Therefore, it is essential in the prior art processes to add a third substance capable of inducing the phase separation of the aqueous polyvinyl alcohol polymer solution thereby causing liquid-liquid phase separation. Suitable such phase separation inducers include inorganic salts such as sodium sulfate; organic solvents which are soluble in water but which behave as nonsolvents for polyvinyl alcohol such as isopropyl alcohol, and macromolecules soluble in water but immiscible with polyvinyl alcohol such as gum arabic. The phase separation inducers cannot be materials which are themselves wall formation components but are instead impurities in the polyvinyl alcohol polymer which becomes the wall material. It is necessary therefore to remove the phase separation inducer from the membrane by washing or some other treatment after microcapsule formation. Such a post wall formation treatment is disadvantageously complicated and troublesome.

The above conventional processes also have the disadvantage that since the phase separation inducer which is incorporated in the capsule wall membrane is removed during the step in which the impurities are removed, the microcapsules obtained are apt to be porous thereby possibly allowing the material in the interior of the microcapsules to escape. Moreover, another problem with the conventional processes is that it is difficult to adjust the amount of and the rate of addition of the phase separation inducer. If the rate of addition is too fast or the amount is excessive, the capsules are apt to congregate into group-like bunches. Conversely, if the rate of addition is too slow or the amount added is insufficient, a fairly prolonged period of time is required for microcapsulation. A need therefore continues to exist for an improved microcapsule formation process which overcomes the problems inherent in the use of a phase separation inducer.

SUMMARY OF THE INVENTION

Briefly, one object of the present invention is to provide a process for forming microcapsules which eliminates the use of a phase separation inducer during preparation.

Another object of the present invention is to provide a microcapsulation process which can be conducted simply and in a short time to produce microcapsules whose walls are dense and have a low porosity.

Accordingly, these objects and other objects of the present invention as hereinafter will become more readily apparent can be attained by a method for producing microcapsules having walls formed from a polyvinyl alcohol polymer by:

(a) dispersing a substantially water insoluble nuclear material in an aqueous solution of a polyvinyl alcohol polymer, which solution has a cloud point, (b) phase separating and depositing a concentrated aqueous solution of the polyvinyl alcohol polymer as a separated phase around said nuclear material by maintaining the temperature of the system above the cloud point of the aqueous polyvinyl alcohol type polymer solution, and (c) subjecting the phase separated solution to conditions which substantially solidify or gel said polyvinyl alcohol polymer in said concentrated aqueous solution of said separated phase around said nuclear material which do not substantially solidify or gel the polyvinyl alcohol in the diluted aqueous solution of the continuous phase.

DETAILED DESCRIPTION OF THE PREFERRED EMBODIMENTS

The key feature of the present invention is a microencapsulation process which involves the use of a polyvinyl alcohol polymer which has a cloud point when it is formulated into an aqueous solution. In the process nuclear material is dispersed in the aqueous solution, which results in the appearance of a concentrated aqueous solution of the polyvinyl alcohol polymer as a separate phase around the nuclear material so that microcapsules are formed which have walls composed of the polyvinyl alcohol polymer swollen with water which surround the particles of the nuclear material. Finally, the separated phase is solidified under specific conditions.

An important feature of the present invention resides in the phenomenon that the polyvinyl alcohol polymer itself causes liquid-liquid phase separation in aqueous solutions thereof at temperatures above the cloud point of the aqueous solution. Because of this fact, separation can be achieved in the present process without the use of a phase separation inducer which necessarily involves specific narrow conditions, and the desired microencapsulation can be effected by a procedure which simply involves raising the temperature of the system to above the cloud point of the aqueous polyvinyl alcohol polymer solution. Moreover, because pore formation in the walls of the microcapsules which normally occurs by the removal of the phase separation inducer and other impurities does not occur, the microcapsules obtained have dense walls with a low degree of porosity.

The term "cloud point" as used in the present specification means a temperature defined as follows: The aqueous polyvinyl alcohol polymer solution used in the present process is a transparent homogeneous solution at low temperature. However, when the temperature is raised to a certain point, minute droplets of the polyvinyl alcohol polymer appear in the concentrated aqueous solution and the system becomes cloudy. The temperature at which the clouding begins to take place is called the "cloud point". The phase separation of the present system is not a solid-liquid phase separation, but instead is a liquid-liquid phase separation. This can be confirmed by the fact that, when the clouded system is allowed to stand at a temperature above the cloud point for hours, the minute droplets of the concentrated aqueous polyvinyl alcohol polymer solution gradually settle down and two transparent layers result. The upper layer is a diluted aqueous solution and the lower layer is the concentrated aqueous solution.

Suitable polyvinyl alcohol polymers which can be used in the present invention include those containing not less than 60 mol % total of vinyl alcohol units and vinyl acetate units and having a cloud point when formulated into aqueous solutions. For example, suitable polymers include partially saponified polyvinyl alcohols having saponification degrees of 60-80 mol %; completely or partially saponified, modified polyvinyl alcohols obtained by the introduction of 0.1-20 mol % of ethylene and/or an olefin having a long chain alkyl group of 3 to 20 carbon atoms into the polymer by copolymerization and/or by modification of the polymer after the polymerization reaction; partially saponified, modified polyvinyl alcohols obtained by introduction of 0.1-5 mol % of a hydrophilic group into the polymer by copolymerization; partially or completely saponified, modified polyvinyl alcohols obtained by the introduction of 0.1-20 mol % of a hydrophilic group and 0.1-20 mol % of ethylene and/or an olefin having a long chain alkyl group of 3-20 carbon atoms into the polymer by copolymerization and/or by modification of the polymer after the polymerization reaction; partially or completely saponified polyvinyl alcohols having a lactone ring content of 1-40 mol %; and so forth. These polyvinyl alcohol polymers can be prepared by: (1) polymerizing vinyl acetate alone, followed by saponification; (2) copolymerizing vinyl acetate with at least one comonomer selected from the group of ethylene, olefinically unsaturated compounds each having a long chain alkyl group and olefinically unsaturated, hydrophilic-group-containing compounds, followed by saponification; (3) polymerizing vinyl acetate alone or copolymerizing vinyl acetate with an olefinically unsaturated compound having a hydrophilic group, followed by saponification and by subsequent acetalization, esterification and/or etherification with an aldehyde, acid and/or alcohol each having a long chain alkyl group; (4) copolymerizing vinyl acetate with an olefinically unsaturated compound having a carboxyl or carboxylate ester group, followed by saponification and by subsequent acid or heat treatment, and other methods.

Suitable examples of olefinically unsaturated compounds which have a long chain alkyl group are alpha olefins such as 1-octadecene, 1-hexadecene, 1-dodecene and 1-octene; vinyl esters such as vinyl stearate, vinyl laurate, vinyl versatate and vinyl propionate; acrylate esters such as stearyl acrylate, lauryl acrylate, octyl acrylate and butyl acrylate; methacrylate esters such as stearyl methacrylate, lauryl methacrylate, octyl methacrylate and butyl methacrylate; vinyl ethers such as stearyl vinyl ether, lauryl vinyl ether and butyl vinyl ether, and similar compounds having a long chain alkyl group of 3-20 carbon atoms in the side chain.

Suitable examples of olefinically unsaturated compounds having a hydrophilic group are, for example, carboxyl-containing compounds such as acrylic acid, methacrylic acid, maleic acid, maleic anhydride, itaconic acid and fumaric acid and esters thereof; sulfonic acid compounds such as vinylsulfonic acid and allylsulfonic acid, esters and alkali metal salts thereof; and nitrogen-containing compounds such as vinylpyrrolidone, acrylamide, N-substituted acrylamides and vinyl pyridine.

Suitable examples of the above described olefinically unsaturated compounds having a carboxyl or carboxylate ester group include acrylic acid, methacrylic acid, maleic acid, maleic anhydride, itaconic acid and fumaric acid, and esters thereof.

Suitable examples of aldehydes, acids, and alcohols which have a long chain alkyl group for use in the modification of the vinyl polymer after polymerization include stearic acid, stearylaldehyde, stearyl alcohol, lauric acid, laurylaldehyde, lauryl alcohol, butyric acid, butyraldehyde, butanol, and the like.

Generally, with respect to the vinyl polymers there is a tendency for the cloud point at a given concentration of polymer in the aqueous solution to become lower as the degree of saponification decreases, as the ethylene content of the polymer becomes greater, as the degree of modification with a long chain alkyl group becomes greater and as the lactone ring content becomes greater. On the other hand, with an increase in the degree of modification of the polymer with a hydrophilic group, the higher the cloud point is apt to be. If the saponification degree and/or modification degree is beyond the limits mentioned previously, either the cloud point of the aqueous solution will be as high as above 100° C., which essentially means there is no cloud point, or the polymer is insoluble in cold water and will not form a homogeneous solution. Both of these situations are not suited for achieving the object of the invention. Generally, there is a relationship between the cloud point and the concentration of the aqueous polyvinyl alcohol polymer solution such that with an increase in the concentration of the polyvinyl alcohol polymer, the cloud point first decreases, but with a further increase in concentration, the cloud point rises. Therefore, the operational temperature optimum for the microencapsulation process is determined by the varying properties of the polyvinyl alcohol polymer used and/or by variations in the concentration of the polyvinyl alcohol polymer in the aqueous solution. Generally, however, operational conditions are employed such that the cloud point is higher than 10° C. On the other hand, an excessively high cloud point generally means that a large amount of heat is required to cause phase separation. The heat requirement may cause undesirable changes in the concentration of the polyvinyl alcohol polymer because of evaporation of the solvent water or cause the formation of a skin or film on the surface of the aqueous solution. Preferably, therefore, the operational conditions are selected such that the cloud point is 80° C. or below. Moreover, a further consideration is that there is generally a relationship between the polyvinyl alcohol polymer concentration in the aqueous solution and the polyvinyl alcohol polymer concentration in the concentrated aqueous phase formed by phase separation at a temperature above the cloud point such that the lower the former is, the higher the latter is. For this and other reasons, it is preferable to maintain the polyvinyl alcohol polymer concentration in the range of 0.5-10 weight % in order to efficiently form the membrane walls from the polyvinyl alcohol polymer.

In the present process it is necessary to maintain the concentration of the polyvinyl alcohol polymer in the aqueous solution within the range of 0.5-10 weight % only at the time of phase separation. Therefore, it is also possible, for example, (1) to use an aqueous solution of greater polyvinyl alcohol polymer concentration in the dispersion step to increase the efficiency of this step and then adjust the concentration to the desired level by dilution of the solution, or (2) to use a more dilute aqueous polyvinyl alcohol polymer solution in the dispersion step and then adjust the concentration in the phase separation step upward by gradually adding a concentrated aqueous solution of the polyvinyl alcohol polymer to the dilute solution. For various reasons such as those mentioned above, it is preferable that the aqueous polyvinyl alcohol polymer solution which contains a substantially water insoluble nuclear material dispersed therein, has a cloud point between 10° C. and 80° C. More directly, it is preferable for ordinary purposes to select an aqueous polyvinyl alcohol polymer solution which exhibits a cloud point between 10° C. and 80° C. at concentrations in the whole range of 0.5–10 weight % or within a portion of said range.

Another factor or relationship which exists in the process of the present invention, is that provided the amount of the polyvinyl alcohol polymer used is constant, the thickness of the wall membrane of the capsules obtained decreases as the amount of the nuclear material employed increases, and vice versa. Therefore, the thickness of the capsule membrane can be varied in several ways by altering the concentration of the aqueous polyvinyl alcohol polymer solution or by altering the ratio of the amount of the aqueous polyvinyl alcohol polymer solution used relative to that of the nuclear material. For the process of the present invention, it is preferable to employ conditions in which the polyvinyl alcohol polymer amounts to 5–50 weight % of the nuclear material.

With regard to the methods employed for treating the wall membranes of the capsules to solidify the same, any satisfactory technique for accomplishing the same may be used which techniques include the use of any compound capable of reacting with the polyvinyl alcohol polymer which exhibits a substantial solidification or gelation action against the separated phase of a concentrated aqueous solution of the polyvinyl alcohol polymer. Suitable compounds having such an action are organic titanium compounds such as diisopropoxytitanium bis(acetylacetonate) and amino alcohol titanium chelates; inorganic titanium compounds such as titanium trichloride, titanyl sulfate and titanic acid; combinations of titanium trichloride and an oxidizing agent such as potassium nitrate; and sodium aluminate, and silicic acid esters such as tetraethyl orthosilicate, and silicates such as sodium silicate; boric acid and borates such as borax and calcium borate. These compounds have a gelating action against the concentrated aqueous solution of the polyvinyl alcohol polymer. Since an excessive amount of such a compound may exert an increased gelating or viscosity action not only on the concentrated aqueous solution but also on the continuous phase consisting of a diluted aqueous solution or may cause aggregation and/or precipitation, it is necessary to select an appropriate amount of the compound to be added.

Another method of solidification usable in the present process involves reacting the polymer with a dialdehyde such as glyoxal or glutaraldehyde in the presence of an acid catalyst. This solidification method is most suitable for the purposes of the present invention from the viewpoint of ease of the reaction and the possibility of yielding capsules which possess excellent water resistance. In this case, too, it is necessary to perform solidification under those conditions which do not cause any problems to the continuous phase consisting of the diluted aqueous solution such as an increase in viscosity or gelatin. While monoaldehyde compounds such as formaldehyde, acetaldehyde, butyraldehyde and benzaldehyde may also be used for purposes of solidification simultaneously with or separately from the treatment with the dialdehyde compound, the use of such a monoaldehyde compound alone cannot be employed because the porosity of the wall of the microcapsules finally obtained is high and also because aggregation is apt to take place.

A further solidification technique appropriately usable for the process of the invention involves graft polymerization of a vinyl monomer onto the polyvinyl alcohol polymer in the aqueous phase in the presence of a cerium salt, persulfate, sulfite or other catalyst. Suitable examples of vinyl monomers include, (meth)acrylonitrile, methyl (meth)acrylate, ethyl (meth)acrylate, butyl (meth)acrylate, acrolein and crotonaldehyde which can polymerize to give a water insoluble polymer. It is believed that such a monomer is grafted onto the polyvinyl alcohol polymer thereby forming minute particles which unite with each other to form a water resistant film.

In addition to the above-mentioned three methods, which specifically are: (1) crosslinking by means of a metallic compound, (2) acetalization by means of a dialdehyde compound and (3) rendering the capsule walls hydrophobic by means of graft polymerization; any reaction which achieves substantial solidification or gelation on the concentrated phase, but which substantially does not exert a solidifying or gelating action on the diluted phase may be employed. Furthermore, other solidification reactions can be employed which do not involve the use of "solidifying agents". Thus, for example, it is possible to subject the capsule walls to high energy radiation such as an electron beam or gamma ray to achieve solidification. Any combination of two or more of the above-mentioned methods may be employed.

The amount of the solidifying agent employed or the extent to which the solidification reaction occurs depends upon the strength of the wall membrane as required for the purpose for which the microcapsules are to be used. Generally, the amount of solidifying agent employed is within the range of 0.1–1000 weight % based on the polyvinyl alcohol polymer. Usually, the solidifying agent is added to the system during the solidification step. In the case when a solidifying agent is capable of reacting only in the presence of a catalyst, it is possible to add the agent to the reaction solution in a step prior to the solidification step, e.g. in the dispersion step or in the phase separation step, and then to add the catalyst in the solidification step. Alternatively, the sequence of addition of solidifying agent and catalyst can be reversed.

The only requirement for the nuclear material which is to be encapsulated is that it should be substantially water insoluble, and that it may be either a solid or a liquid. Suitable nuclear materials which can be employed include mineral oils such as petroleum, kerosene, gasoline, naphtha and paraffin oil; animal oils such as fish oil and lard oil; vegetable oils such as peanut oil; linseed oil, soybean oil, castor oil and corn oil; organic solvents such as biphenyl derivatives and phthalate esters, and so forth. It is also possible to use solutions or dispersions of polymers, adhesives, dyestuffs, perfumes, pigments, agricultural chemicals, medicinals and the like in the liquid materials. Further, when the nuclear materials are to be dispersed in aqueous polyvinyl alcohol polymer solutions, dispersing agents such as anionic surfactants and nonionic surfactants may be added to the system. In addition, in order to prevent aggregation of particles during the phase separation step and the solidification step, one or more aggregation inhibitors selected from the group consisting of alkylsulfonic acids, alkyl sulfuric acids, alkylbenzenesulfonic acids, naphthalenesulfonic acid-formaldehyde condensation products, and alkali metal salts thereof may effectively be added. It is generally most preferred for the purposes of the present invention to add such an aggregation inhibitor to the reaction material immediately before the solidification step or to add the same together with the solidifying agent. However, it is also possible to utilize a portion of the aggregation inhibitor as a dispersing agent in an earlier step, e.g. in the dispersion step, so long as it does not cause any inconveniences. Since the aggregation inhibitors also have an effect on the cloud point of an aqueous solution containing the polyvinyl alcohol polymer by raising the same, they may effectively be used as a cloud point adjusting agent.

After solidification of the polyvinyl alcohol polymer wall membrane is complete, the microcapsules of the invention are removed by filtration and dried. They may be used in powder form, or they may be used as they are, i.e, in the form of a suspension in water.

When the present process is employed, microcapsules having diameters of 1–5000 microns can be prepared at will.

The obtained microcapsules can be used in the fields of pressure sensitive paper, thermosensitive paper, agricultural chemicals, adhesives, perfumes and medicinals.

Having generally described this invention, a further understanding can be obtained by reference to certain specific examples which are provided herein for purposes of illustration only and are not intended to be limiting unless otherwise specified.

EXAMPLE 1

A four (4) gram quantity of 50% glutaraldehyde was added to 400 grams of a 2 weight % aqueous solution of a partially saponified polyvinyl alcohol having a saponification degree of 71 mol % and a polymerization degree of 700, said 2 weight % aqueous solution having a cloud point of 27° C. The temperature of the solution was adjusted to 25° C. Thereto was added 40 grams of isopropylbenzene (boiling point: 152° C.), and an oil-in-water type dispersion was formed by stirring. The diameter of the droplets in the dispersion amounted to about 50 microns, and thereafter the temperature was raised to 35° C. over 5 minutes with gentle stirring. Thirty minutes later, capsules were obtained having polyvinyl alcohol walls swollen with water. Microscopic observation of the capsules revealed that they were for the most part spherical mononuclear capsules having particle sizes of about 50 microns. The capsules were solidified by adding 20 ml of 35 weight % hydrochloric acid dropwise to the capsule suspension over 10 minutes, separated by filtration through a polyester cloth, and then dried at 80° C. for 3 hours. The capsules obtained as a powder were spherical mononuclear capsules having a grain size of about 50 microns. When the capsules were heated at 95° C. for 2 days, no weight loss was found in isopropylbenzene.

To show the superiority of the process of the invention over the prior art processes with respect to the ease of preparing mononuclear capsules to the brevity of time required and to the denseness of the walls of the obtained capsules which is a measure of the degree of retention of the nuclear material, some relevant data are shown in Table 1 in comparison to several Examples within the scope of the prior art.

TABLE 1

|  | Example 1 | Example for Comparison 1 | Example for Comparison 2 |
|---|---|---|---|
| 1. Time required for the encapsulation process (min.) | 35 | 200 | 400 |
| 2. Shape of capsules | Spherical | Grape like bunch | Grape like bunch |
| 3. Aggregation | Not aggregated | Aggregated | Aggregated |
| 4. Capsule grain size | 50 microns | 500–2000 microns | 100–1000 microns |
| 5. Retention of the nuclear material (weight loss of isopropylbenzene) | 0% | 20% | 10% |

EXAMPLE FOR COMPARISON 1

A four (4) gram amount of a 50% glutaraldehyde solution was added to 400 grams of a 2 weight % aqueous solution of a polyvinyl alcohol having a saponification degree of 88 mol % and a polymerization degree of 1750. The aqueous solution exhibited no cloud point however, and the temperature was adjusted to 25° C. Thereto was added 40 grams of isopropylbenzene (boiling point: 152° C.), and an oil-in-water type dispersion was formed by vigorous stirring, in which dispersion the droplets had diameters of about 50 microns. Thereafter, 100 ml of a 10% sodium sulfate solution as a phase separation inducer was added dropwise at a rate of 1 ml/2 minutes over 200 minutes with gentle stirring. The reagent caused formation of capsules having polyvinyl alcohol walls swollen with water. Microscopic observation revealed that the smaller capsule particles formed aggregates of several particles much like a bunch of grapes which has a size of 500–2000 microns. The capsules were then solidified by adding dropwise 20 ml of 35 weight % hydrochloric acid to the capsule suspension. Thereafter, the solidified particles were transferred onto a polyester cloth, washed well with water and filtered, and dried at 80° C. for 3 hours. The obtained capsules occurred as a powder consisting of aggregates each having a particle size of 500–2000 microns. The weight loss on heating this product at 95° C. for 2 days was as shown in Table 1.

EXAMPLE FOR COMPARISON 2

A four (4) gram amount of a 50 weight % glutaraldehyde solution was added to 400 grams of a 2 weight % aqueous solution of a polyvinyl alcohol having a saponification degree of 88 mol % and a polymerization degree of 1750, said aqueous solution having no cloud point however. The temperature was adjusted to 25° C. Thereto was added 40 grams of isopropylbenzene, and the mixture was stirred vigorously thereby yielding an oil-in-water type dispersion in which the droplets had diameters of about 50 microns. Then, 200 ml of a 10 weight % aqueous solution of gum arabic as a phase separation inducer was added dropwise at a rate of 1 ml/2 minutes over 400 minutes with gentle stirring, to form capsules having polyvinyl alcohol walls swollen with water. Microscopic observation of the capsules showed that the smaller capsule particles formed aggregates of several particles much like a bunch of grapes which had a grain size of 100–1000 microns. The capsules were solidified by adding dropwise 20 ml of 35 weight % hydrochloric acid to the capsule suspension, thereby causing gelation of the polyvinyl alcohol. The capsules were then transferred onto a polyester cloth, washed well in flowing water, filtered, and dried at 80° C. for 3 hours. The capsules were obtained as a powder consisting of aggregates each having a grain size of 100–1000 microns. The weight loss on heating this product at 95° C. for 2 days was as shown in Table 1.

EXAMPLE 2

A partially saponified polyvinyl alcohol (8 grams) having a saponification degree of 71 mol % and a polymerization degree of 700, (a 2 weight % aqueous solution having had a cloud point of 27° C.), was dissolved in 400 grams of water at 25° C. Thereto was added 40 grams of isopropyl naphthalene containing 2 weight % of crystal violet lactone dissolved therein, and the mixture was stirred vigorously to form an oil-in-water type dispersion in which the oil droplets had diameters of 10–15 microns. Then the temperature was raised to 37° C. with gentle stirring. After maintaining the solution at 37° C. for 30 minutes, the capsules were solidified by adding 10 ml of triethanolamine titanium chelate (product of Yushi Seihin Co., Ltd., "Organotix TC 400" by trade name).

The resulting capsule slurry was applied to a base paper having a basis weight of 40 grams/m² at a dosage of 6 grams/m² on the solid base. When the coated paper was placed upon a clay coated paper prepared by the process mentioned below and figures were written thereon with a pencil, distinct blue images were developed.

The clay coated paper was prepared by dispersing 100 grams of activated clay in 300 grams of water containing 5 grams of 40 weight % aqueous caustic soda solution by means of a homogenizer, adding 40 grams of Dow Latex 636 (trade name: styrene-butadiene type latex produced by Dow Chemical Company) to the dispersion, and coating a base paper having a basis weight of 50 grams/m² with the resulting composition at a dosage of 12 grams/m² on a solid basis.

EXAMPLE 3

Into 400 grams of a 2 weight % aqueous solution of a partially saponified polyvinyl alcohol having a saponification degree of 71 mol % and a polymerization degree of 700, was dissolved 0.8 grams of a condensation product of sodium naphthalenesulfonate with formaldehyde (product of San-Nopco Co. Ltd., "Lomar D" by trade name) as an aggregation inhibitor. The aqueous solution had a cloud point of 39° C. To this aqueous solution was added 40 grams of isopropylnaphthalene containing 2% of crystal violet lactone dissolved therein, and the mixture was stirred vigorously at 25° C. There was formed an oil-in-water type dispersion wherein the oil droplets had diameters of 10–15 microns. The temperature was then raised to 45° C. with gentle stirring. After maintaining at 45° C. for 30 minutes, the capsules were weakly solidified by adding 2 grams of triethanolamine titanium chelate (product of Yushi Seihin Co., Ltd., "Organotix TC 400" by trade name). The capsules were further, i.e., more strongly, solidified by adding 2 grams of 50 weight % glutaraldehyde and 10 ml of 1-N nitric acid to the solution.

The resulting capsule slurry was applied to a base paper as in Example 2. Placing the coated paper on the clay coated paper followed by writing with a pencil gave distinct blue developed images.

EXAMPLE 4

In 400 grams of water was dissolved 8 grams of a partially saponified polyvinyl alcohol having a saponification degree of 80 mol % and a polymerization degree of 2000. A 2 weight % aqueous solution of said polymer had a cloud point of 35° C. Thereto was added 5 grams of 40 weight % glyoxal. Thereafter, to the solution was subsequently added 40 grams of chlorinated paraffin containing 20 weight % of linalool (perfume smelling like a lily of the valley, produced by Kuraray Co., Ltd.) dissolved therein. The mixture was stirred thereby yielding an oil-in-water type dispersion wherein the droplet diameters were about 100 microns. Then, the temperature was raised to 40° C. over 10 minutes with gentle stirring. After maintaining at 40° C. for 30 minutes, the capsules were solidified by adding 20 ml of 40 weight % sulfuric acid dropwise over 10 minutes. The capsules were recovered by filtration and dried at 80° C. for an hour. Particles in powder form were obtained.

Microscopic observation of the capsules thus obtained showed that they were spherical, mononuclear capsules with a size of 100 microns.

Breaking the capsules under pressure caused the smell of a lily of the valley to diffuse.

EXAMPLE 5

A 5-liter flask was charged with 1100 grams of methanol, 3300 grams of vinyl acetate, 57 grams of vinyl versatate (vinyl esters of branched aliphatic carboxylic acids with an average number of carbon atoms of (10) and 0.66 gram of azobisisobutyronitrile, and polymerization was carried out at 60° C. for 5 hours. The product polymer was saponified with caustic soda in methanol, and as a result there was obtained a modified polyvinyl alcohol containing 0.75 mol % of vinyl versatate as copolymer component and having a saponification degree of 93 mol % and a viscosity of a 4% aqueous solution at 20° C. of 50 centipoises. A 1 weight % aqueous solution of this modified polyvinyl alcohol had a cloud point of 50° C.

A forty (40) gram amount of dioctyl phthalate was added to 400 grams of a 1 weight % aqueous solution of the modified polyvinyl alcohol, and the mixture was stirred vigorously, thereby forming an oil-in-water type dispersion wherein the droplets had diameters of about 100 microns. The temperature of the system was then raised to 60° C. over 10 minutes with gentle stirring. After 30 minutes, microcapsules were formed having walls of the modified polyvinyl alcohol swollen with water. The capsules were solidified by adding 20 ml of a 1% aqueous titanium trichloride solution as a solidification treatment agent, and further by adding a 5% aqueous potassium nitrate solution.

The obtained capsules were spherical and mononuclear and had particle sizes of about 100 microns.

EXAMPLE 6

A 5-liter flask was charged with 2400 grams of methanol, 1545 grams of vinyl acetate, 0.7 gram of itaconic acid, 55 grams of vinyl versatate and 10 grams of azobisisobutyronitrile. Polymerization of the reactants was effected at 60° C. for 5 hours with the continuous addition of 20.6 grams of itaconic acid. The resulting copolymer was saponified with caustic soda in methanol and there was obtained a modified polyvinyl alcohol containing 1 mol % of itaconic acid and 1.5 mol % of vinyl versatate as copolymer components. This modified polyvinyl alcohol had a saponification degree of 98.5 mol %, the viscosity of its 4 weight % aqueous solution at 20° C. was 10 centipoises and the cloud point of its 1 weight % aqueous solution was 50° C.

Using a 1 weight % aqueous solution of this modified polyvinyl alcohol and proceeding as in Example 5, there were obtained spherical, mononuclear capsules with particle sizes of about 100 microns.

EXAMPLE 7

An autoclave was charged with 200 grams of methanol, 800 grams of vinyl acetate and 0.3 gram of azobisisobutyronitrile. Thereafter, ethylene gas was introduced into the solution and the reaction was conducted at a pressure of 10 kg/cm$^2$ and at a temperature of 60° C. for 4 hours.

The resulting ethylene-vinyl acetate copolymer was saponified completely with caustic soda in methanol, thereby yielding a modified polyvinyl alcohol containing 10 mol % of ethylene as copolymer component. The cloud point of a 2 weight % aqueous solution of this modified polyvinyl alcohol was 40° C.

Using the 2 weight % aqueous solution and proceeding as in Example 5, spherical, mononuclear capsules were obtained which had diameters of about 100 microns.

EXAMPLE 8

A 500-ml flask provided with a nitrogen gas inlet, a cooler and a blade stirrer was charged with 60 grams of a 5 weight % aqueous solution of a partially saponified polyvinyl alcohol having a saponification degree of 70 mol % and a polymerization degree of 700, whose 1 weight % aqueous solution had a cloud point of 27° C., together with 60 grams of isopropylnaphthalene containing 2 weight % of crystal violet lactone dissolved therein. The contents were stirred vigorously at 20° C. to form an oil-in-water type dispersion wherein the oil droplets had diameters of 10-15 microns. Thereafter, 240 grams of water at 20° C. was added, nitrogen gas was introduced into the space above the liquid surface in the flask, and the temperature was raised to 35° C. under stirring. An hour later, capsules had formed having polyvinyl alcohol walls swollen with water. To the capsule suspension were added 25 grams of acrylonitrile and a further 15 ml amount of an aqueous solution of ceric ammonium nitrate at a concentration of 0.1 mole/liter, liter, dissolved in 1 N-aqueous nitric acid. The solidification treatment for the capsules by graft polymerization was conducted for an hour. The obtained capsule slurry was applied to a base paper as in Example 2. Placing the so-called paper on the clay coated paper followed by writing with a pencil gave rise to distinct blue developed images.

For comparison, when a polyvinyl alcohol having a saponification degree of 99 mol % and a polymerization degree of 1750, whose 1 weight % aqueous solution had no cloud point was used in the manner described above, no capsules could be obtained because the polyvinyl alcohol would not deposit around the oil droplets but rather the system underwent aggregation.

EXAMPLE 9

To 60 grams of a 10 weight % aqueous solution of a partially saponified polyvinyl alcohol having a saponification degree of 72 mol % and a polymerization degree of 700, were added 3.6 ml of 0.5-N sulfuric acid and 2.3 ml of a 5% aqueous solution of sodium dodecylbenzenesulfonate, thereby forming 65.9 g of aqueous solution (A). Separately, an aqueous solution (B) was prepared by adding 6 grams of 50 weight % glutaraldehyde, 0.31 ml of a 5 weight % aqueous solution of sodium dodecylbenzenesulfonate and 66 grams of water to 8 grams of the same 10 weight % aqueous polyvinyl alcohol solution as above. Aqueous solution (A) was gradually added to aqueous solution (B), and the cloud points at various concentrations were measured. In the whole range of concentrations from solution (B) to the solution attained by adding up to 65.9 grams of aqueous solution (A) to aqueous solution (B), the cloud point of the system remained within the range of 45° to 55° C.

Aqueous solution (A) and aqueous solution (B) were newly prepared. To aqueous solution (B) (80 grams) was added 60 grams of isopropylnaphthalene, and the mixture was stirred vigorously at 20° C., to form an oil-in-water type dispersion wherein the oil droplets had sizes of 20-50 microns. The dispersion was heated to 60° C. with stirring. After the temperature reached 60° C., aqueous solution (A) (65.9 grams) at 20° C. was added dropwise over 3 hours. Each portion of aqueous solution (A), upon addition, was immediately diluted by the aqueous solution in the encapsulation system to a given concentration and at the same time underwent phase separation. Further, the so-separated phase was solidified gradually by the action of glutaraldehyde and the sulfuric acid present in the system. After completion of addition of reagent solution (A), heating was continued for an additional hour so that the solidification might be complete. By this procedure mononuclear capsules were obtained having particle sizes of 20-50 microns.

For comparison, the above procedure was followed using a polyvinyl alcohol solution having a saponification degree of 99 mol % and a polymerization degree of 1750. In this case, however, the system underwent aggregation and capsule particles could not be obtained. Moreover, the system showed no cloud point development throughout the whole concentration range from the composition corresponding to aqueous solution (B) to the composition corresponding to the mixture of (B)+(A).

Having now fully described this invention, it will be apparent to one of ordinary skill in the art that many changes and modifications can be made thereto without departing from the spirit or scope of the invention set forth herein.

We claim:

1. A process for producing microcapsules having walls formed from a polyvinyl alcohol polymer in an aqueous medium, which comprises the steps of:
   (a) dispersing a substantially water insoluble nuclear material in an aqueous solution of a polyvinyl alcohol polymer, which solution has a cloud point;
   (b) phase separating and depositing a concentrated aqueous solution of the polyvinyl alcohol polymer as a separated phase around said nuclear material from the bulk continuous phase in the absence of a substance which induces the phase separation by maintaining the temperature of the system above the cloud point of the aqueous polyvinyl alcohol polymer solution; and (c) subjecting the phase separated solution to conditions which substantially solidify or gel said polyvinyl alcohol polymer in said concentrated aqueous solution of said separated phase around said nuclear material but which do not substantially solidify or gel the polyvinyl alcohol in the diluted aqueous solution of the continuous phase.

2. The process of claim 1, wherein said aqueous solution develops its cloud point at a temperature from 10° C. to 80° C.

3. The process of claim 1, wherein steps (b) and (c) proceed concurrently in the same vessel.

4. The process of claim 1, wherein said polyvinyl alcohol polymer is a partially saponified polyvinyl alcohol polymer having a saponification degree of 50-85 mol % and the aqueous polyvinyl alcohol polymer solution thereof has a cloud point between 10° C. and 80° C.

5. The process of claim 1, wherein in step (c) solidification or gelation of polyvinyl alcohol is achieved by weakly solidifying said polyvinyl alcohol in said separated phase with at least one compound selected from the group consisting of titanyl sulfate, titanium trichloride, triethanolamine titanium chelate, sodium aluminate, boric acid and borax as a primary solifitying agent and then strongly solidifying said weakly solidified separated phase with a secondary solidifying agent comprising a dialdehyde and an acid catalyst.

6. The process of claim 1, wherein said polyvinyl alcohol is a partially saponified polyvinyl alcohol having a saponification degree of 60-80 mol %, a completely or partially saponified, modified polyvinyl alcohol obtained by the introduction of 0.1-20 mol % of ethylene and/or an olefin having a long chain alkyl group of 3 to 20 carbon atoms into the polymer by copolymerization and/or by modification of the polymer after the polymerization reaction; partially saponified, modified polyvinyl alcohols obtained by introduction of 0.1-5 mol % of a hydrophilic group into the polymer by copolymerization; partially or completely saponified, modified polyvinyl alcohols obtained by the introduction of 0.1-20 mol % of a hydrophilic group and 0.1-20 mol % of ethylene and/or an olefin having a long chain alkyl group of 3-20 carbon atoms into the polymer by copolymerization and/or by modification of the polymer after the polymerization reaction; or a partially or completely saponified polyvinyl alcohol having a lactone ring content of 1-40 mol %.

7. The process of claim 6, wherein said olefin having a long chain alkyl group is 1-octadecane, 1-hexadecene, 1-dodecene, 1-octene, vinyl stearate, vinyl laurate, vinyl versatate, vinyl propionate, stearyl acrylate, lauryl acrylate, octyl acrylate, butyl acrylate, stearyl methacrylate, lauryl methacrylate, octyl methacrylate, butyl methacrylate, stearyl vinyl ether, lauryl vinyl ether or butyl vinyl ether.

8. The process of claim 1, wherein the concentration of polyvinyl alcohol in said aqueous solution at the moment of phase separation ranges from 0.5 to 10 wt %.

9. The process of claim 1, the amount of polyvinyl alcohol in said aqueous solution ranges from 5 to 50 wt. % of the amount of nuclear material dispersed in said aqueous solution.

10. The process of claim 1, wherein said nuclear material is a mineral oil, animal oil, vegetable oil or an organic solvent.

11. The process of claim 1, wherein the dispersal of nuclear material in said aqueous solution is facilitated by the inclusion of an anionic or nonionic surfactant.

12. Microcapsules prepared by the process of claim 1.

* * * * *